United States Patent [19]
Kovacs

[11] 3,832,834
[45] Sept. 3, 1974

[54] LAWN MOWER HITCH
[76] Inventor: George E. Kovacs, 8562 Olde Eight Rd., Northfield, Ohio 44067
[22] Filed: Dec. 18, 1972
[21] Appl. No.: 315,794

[52] U.S. Cl. .................................. 56/6, 280/411 C
[51] Int. Cl. ............................................ A01d 75/30
[58] Field of Search .......... 56/6, 7; 280/411 C, 412, 280/413

[56] References Cited
UNITED STATES PATENTS
| | | | |
|---|---|---|---|
| 2,139,200 | 12/1938 | Moyer | 56/7 |
| 2,955,848 | 10/1960 | Hyland et al. | 280/411 C |
| 3,135,079 | 6/1964 | Dunn | 56/6 |
| 3,608,284 | 9/1971 | Erdman | 56/6 |

Primary Examiner—Antonio F. Guida
Attorney, Agent, or Firm—Donnelly, Maky, Renner & Otto

[57] ABSTRACT

An adjustable lawn mower hitch for connecting two rotary type lawn mowers to a tractor or riding mower. The lawn mowers are provided with caster wheels and a connecting flange for coupling to the lawn mower hitch while permitting independent use of the lawn mowers. The lawn mower hitch is adjustable to provide for coupling to lawn mowers having different cutting diameters and is usable for towing only a single lawn mower.

7 Claims, 4 Drawing Figures

PATENTED SEP 3 1974

LAWN MOWER HITCH

BACKGROUND OF THE INVENTION

This invention relates to a hitch apparatus, and more specifically relates to a hitch apparatus for connecting two rotary type lawn mowers to a tractor or riding mower.

Prior art lawn mower hitches have been used for connecting reel type lawn mowers to a tractor for permitting the cutting of a wide swath of grass in a single traversal of a lawn. Such prior art hitches are normally non-adjustable and only suitable for two wheeled reel type lawn mowers which are not efficient on rough terrain.

SUMMARY OF THE INVENTION

Accordingly, a primary object of the invention is to provide a hitch apparatus for connecting rotary type lawn mowers to a riding lawnmower tractor.

Another object of the invention is to provide a hitch apparatus for adjustably connecting rotary type lawn mowers to a tractor.

An additional object of the invention is to provide a hitch apparatus for connecting a plurality of four wheeled independently usable lawn mowers to a tractor.

A further object of the invention is to provide a hitch apparatus for connecting two rotary type lawn mowers in staggered relation for permitting efficient grass cutting while being towed either in either straight or curved directions.

These and other objects and advantages of the present invention will become apparent as the following description proceeds.

To the accomplishment of the foregoing and related ends, the invention, then, comprises the features hereinafter fully described, the following description and the annexed drawings setting forth in detail a certain illustrative embodiment of the invention, this being indicative, however, of but one of the various ways in which the principals of the invention may be employed.

DESCRIPTION OF THE PREFERRED EMBODIMENT

Figure 1:
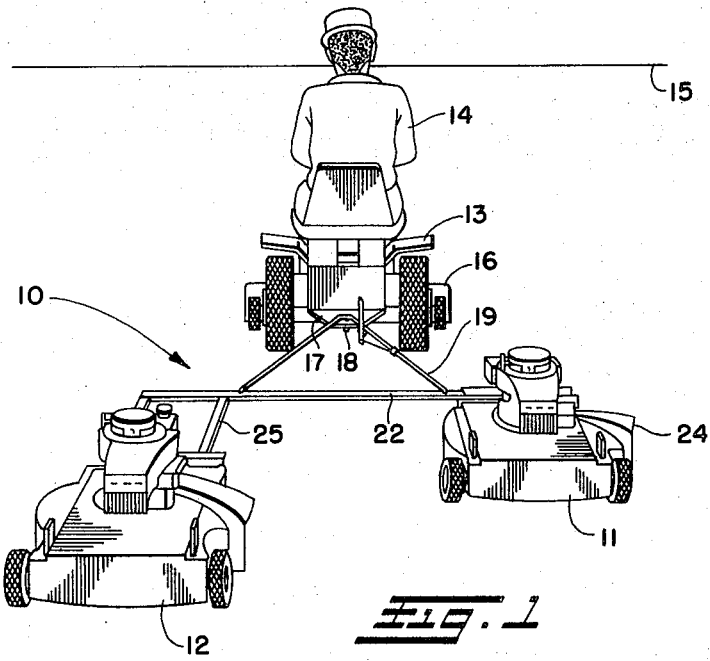
FIG. 1 is a perspective environmental view of a riding mower connected by a lawn mower hitch to two rotary lawn mowers.
Figure 3:
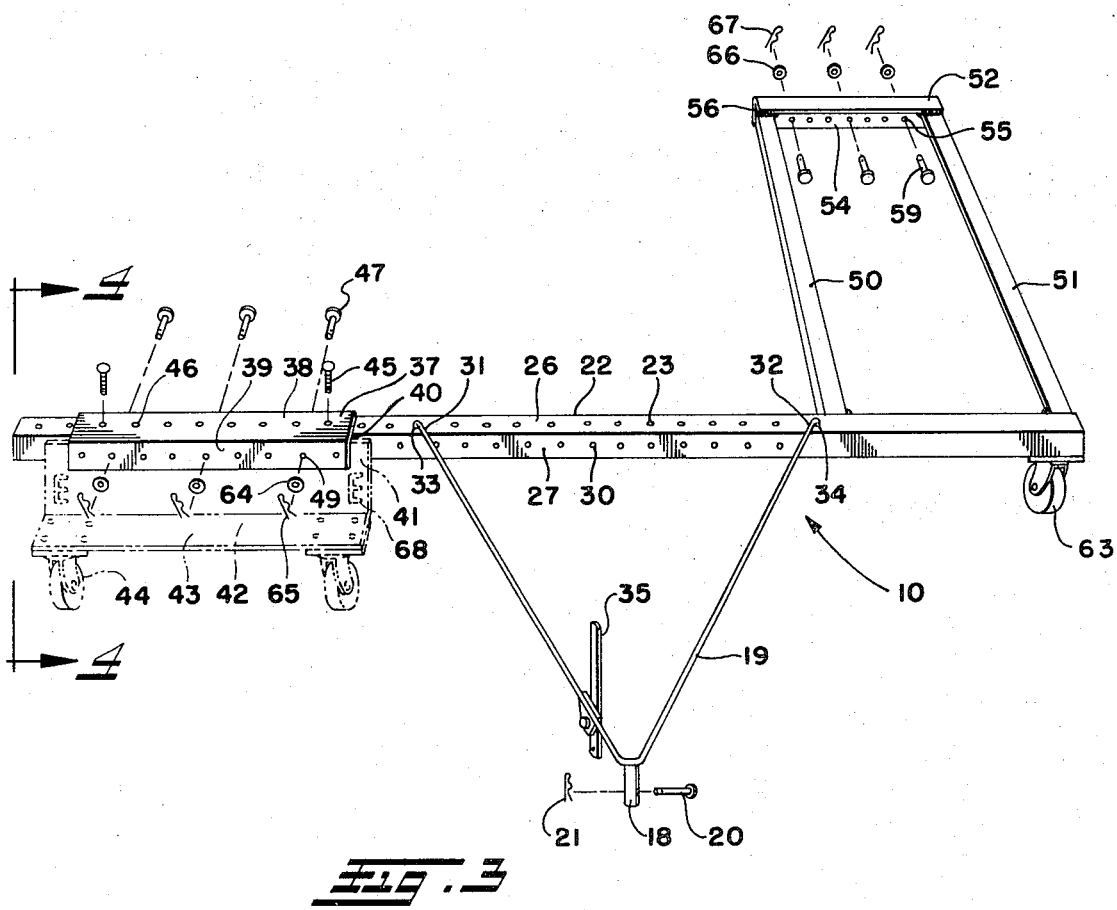
FIG. 3 is a partially exploded perspective view of the lawn mower hitch.

Referring now to the drawings wherein like reference numerals refer to like elements in the several FIGURES, the lawn mower hitch apparatus generally indicated at 10 is shown in FIG. 1 connecting together first and second rotary lawn mowers 11, 12 to a riding mower or tractor 13. As illustrated, the tractor operator 14 drives the towing tractor toward the horizon 15 while the tractor rotary lawn mower 16 cuts a first swath of grass and the first and second towed lawn mowers 11, 12 cut parallel adjacent swaths of grass. The tractor 13 has a hitch plate 17 with an opening through which the lawn mower hitch pin 18 is inserted, the top of which may be welded to a V-shaped draw bar 19. The connector pin is retained in the opening by a securing pin 20 and an associated cotter pin 21 (FIG. 3). The draw bar 19 is connected to the lawn mower hitch main support bar 22 at two locations by insertion of down turned ends into two of a plurality of openings 23 formed in the latter.

The first lawn mower 11 is adjustably connected to the main support bar 22, which extends transversely to the towing direction, and has an outlet 24 for blowing grass clippings from the lawn mower in a direction to the right as shown in FIG. 1.

A rigid support 25 extends rearwardly of the main support bar 22 for connecting the second lawn mower 12 to the lawn mower hitch 10 in staggered relation to the first lawn mower so that the second lawn mower is located further from the tractor than the first lawn mower. The first lawn mower 11 is positioned sufficiently behind the tractor mower 16 but staggered in front of the second lawn mower 12 to avoid becoming clogged with blown grass clippings therefrom.

Figure 2:
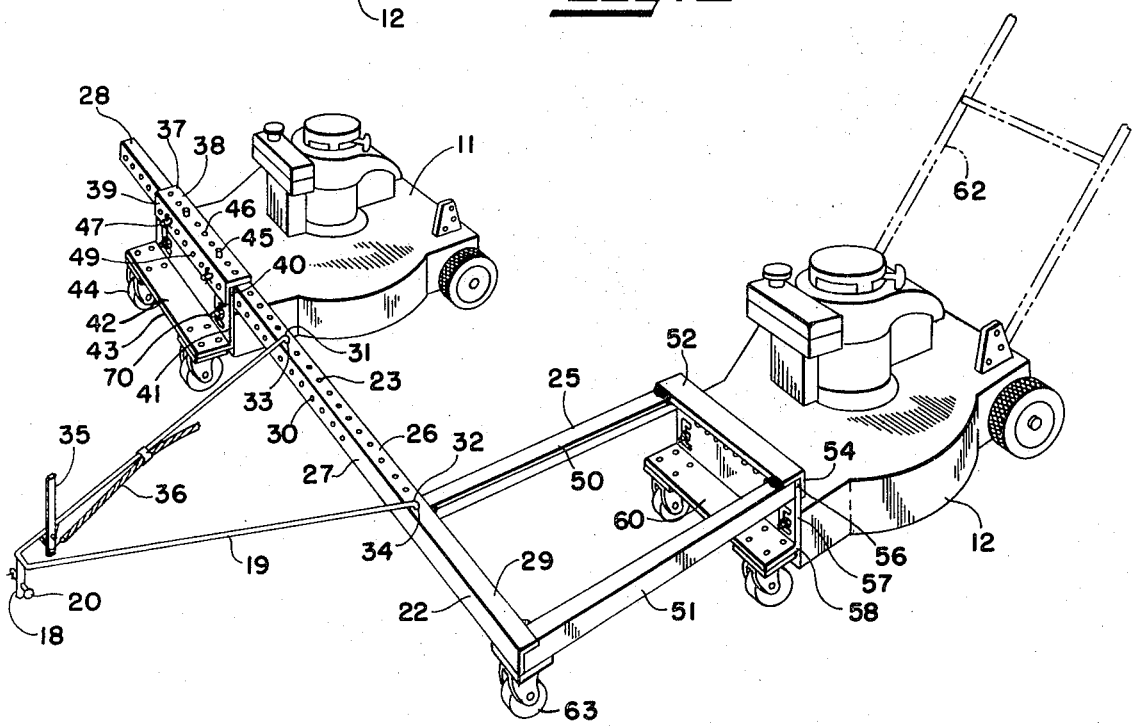
FIG. 2 is an isometric view of the lawn mower hitch connecting together two rotary lawn mowers.

Turning now to FIG. 2, the lawn mower hitch 10 is shown connecting the two lawn mowers 11, 12 to the main support bar 22, which may be, for example, right angle stock, such as steel, having an upper generally horizontal surface 26 and a generally vertical planar surface 27. The main support bar 22 has a first end 28, a second end 29, and an intermediate section therebetween, with the openings 23 in the horizontal surface and openings 30 in the vertical surface being formed only in an adjustable connecting portion thereof which comprises the first end and the intermediate section. The draw bar 19 is bent downwardly at its terminal ends 31, 32, to connect to the main support bar 22 through two openings 33, 34 therein, the choice of such openings being optional to provide adjustment of the position of the draw bar with respect to the rest of the lawn mower hitch. A remote control lever 35 is pivotally connected to the draw bar 19 and is coupled to a control cable 36, such as for example a bowden wire, for adjusting the throttles of the respective lawn mowers 11, 12.

A first adjustable connecting bar 37, which also may be angled stock, is positioned to have a generally horizontal surface 38 overlying the horizontal surface 26 of the main support bar 22 and a vertical planar surface 39 generally overlying the vertical surface 27 of the main support bar but spaced therefrom to define a gap 40 therebetween. The vertical surface 39 of the adjustable connecting bar 37 forms a connecting element for coupling to the lawn mower hitch 10 a vertically extending flange 41 forming part of the first lawn mower 11 front support 42.

The first lawn mower front support 42 also has a generally horizontal planar portion 43 beneath which are secured swivel wheels or casters 44, which comprise the front wheels of the lawn mower 11. A plurality of fasteners inserted through selected openings 46 in the horizontal portion 38 hold the adjustable connecting bar 37 to the main support bar 22 and a plurality of pin connectors 47 are inserted through selected openings 30 in the main support bar vertical surface 27, openings 48 (FIG. 4) in the vertically extending flange 41, and openings 49 in the connecting element 39 securely to hold the lawn mower to the hitch.

The rigid support 25, comprising two parallel spaced angled stock members 50, 51, is welded or otherwise fixed to the main support bar 22 proximate the second end 29, and a second connecting bar 52 of angled stock has an upper horizontal surface 53 fixed to the rigid support members and a vertical surface 54 having openings 55 therein and being spaced from such members to define a second gap 56 therebetween. A vertically extending flange 57 of a second lawn mower support 58 for the second lawn mower 12 is insertable in the second gap 56 and is coupled to the second connecting bar 52 by pin connectors 59 as previously described with respect to the first lawn mower 11, while a horizontal portion 60 of the second lawn mower support 58 provides a connecting surface for swivel wheels or casters 61 therebelow forming the front wheels of the second lawn mower 12. A handle 62 shown in dotted outline may be connected to either lawn mower 11 or 12 to permit the use thereof independently of the lawn mower hitch 10 and tractor.

A further swivel wheel or caster 63 is positioned at the second end 29 of the main support bar 22 to support the same in a generally horizontal plane when in operation. Such wheel also provides support for the rigid support 25 of the lawn mower hitch 10 when the latter is used only with one lawn mower such as the mower 11.

The lawn mower hitch 10 is illustrated in partially exploded form in FIG. 3 to show the various fasteners 45, pin connectors 47, 59, and securing pin 20. The vertical flange 41 of the first lawn mower support 42 is positioned in the gap 40 for retention by the pin connectors 47, which in turn are maintained in position by washers 64 and cotter pins 65. Similarly, the second connecting bar 52 has washers 66 and cotter pins 67 to retain the pin connectors 59 in position when coupling the vertical flange 57 of the second lawn mower to the hitch 10. The lawn mower supports 42, 58 have cut out slot sections 68 for insertion of nut and bolt fasteners 70 that connect same to the respective lawn mowers in adjustable fashion to permit raising or lowering of the wheels 44, 61. The rear wheels of each unit may be adjustable in conventional fashion. The plurality of openings in the various elements of the hitch 10 permit a variety of adjustments to be made for desired positioning of lawn mowers with respect thereto.

Figure 4:
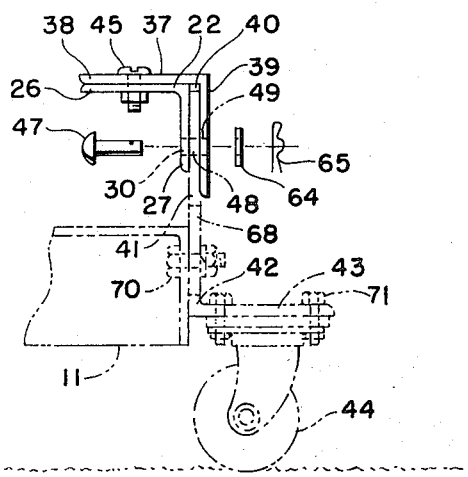
FIG. 4 is an enlarged end elevation partially broken away of a portion of the lawn mower hitch taken from the line 4—4 of FIG. 3.

The gap 40 in which the vertical flange 41 of the first lawn mower support 42 is retained is shown in FIG. 4 as being formed by the leading vertical surface or connecting element 39 of the first connecting bar 37 and the vertical surface 27 of the main support bar 22. The openings in the first connecting bar 37, vertical flange 41, and main support bar 22 are aligned to permit insertion of the pin connectors therethrough, and the latter are retained in position by the washers and cotter pins previously described. The fasteners 45 retain the first connecting bar 37 in position on the main support bar 22, and the nut and bolts 71 hold the wheels 44 to the first lawn mower support 42.

In operation of the hitch apparatus 10, the lawn mowers 11 and 12 are modified to remove the normal front wheels and supports 42, 58 are fixed to the front portion of the rotary lawn mowers 11, 12 by the adjustable bolting or other suitable means. The caster wheels 44, 61 on the lawn mower supports 42, 58 permit easy turning of the lawn mowers without causing same to slide over the grass having a crushing effect thereon and therefore facilitate using the rotary lawn mowers not only with the hitch but also when independently used with their own handles. The first connecting bar 37 is fastened to the main support bar 22 in proper position and the respective vertical flanges of the first and second lawn mower supports are inserted into the gaps 40 and 56 formed by the first and second connecting elements 39 and 54, respectively. The pin connectors 47 and 59 are inserted in place to retain the lawn mowers in position with respect to the hitch 10, and the draw bar 19 is connected to the tractor 13 by the lawn mower hitch connector pin 18 being retained in position in the tractor hitch 17 by the securing pin 20. If desired, the lawn mower hitch 10 may be used with only the first lawn mower 11, and in such operation the wheel 63 maintains the second end 29 of the main support bar 22 as well as the second connecting bar 52 and its rigid support 25 above ground level to eliminate any dragging thereof during towing.

During mowing operation the tractor mower 16 cuts a first swath of grass and blows the grass clippings to the right substantially forward of the first lawn mower 11 to avoid clogging thereof. The first and second lawn mowers 11, 12 also cut respective swaths of grass proximate or partially overlapping the first swath, and such mowers also blow the grass clippings to the right, the second lawn mower being located behind the first to avoid clogging the first lawn mower with grass clippings.

As now may be understood, the invention provides a hitch apparatus for connecting together two rotary lawn mowers for towing by a tractor and which permits efficient grass cutting without clogging the lawn mower motors by grass clippings blown from the lawn mower outlets. The hitch apparatus may be used with one or more lawn mowers provided that each successive lawn mower is staggered behind the preceding one, as described above. While the hitch apparatus has been described with reference to use for towing lawn mowers, it may be used for connecting various types of individually supported devices for towing the same.

The embodiments of the invention in which an exclusive property or privilege is claimed are defined as follows:

1. A hitch for connection to a pair of rotary lawn mowers each having a generally vertical plate secured thereto and extending transversely to the towing direction, each said plate including generally horizontal portions positioned in front of such mowers and having swivelable rotatable wheels thereon for supporting such mowers, said hitch comprising a rigid bar elongated transversely to the direction of towing and having first and second ends separated by an intermediate section, said first end and said intermediate section defining an adjustable connecting portion, said bar having generally horizontal and vertical bar surfaces, a first connecting device adjustably connected to said connecting portion of said bar and having a generally horizontal surface overlying said generally horizontal bar surface and a generally vertical surface spaced from and parallel to said generally vertical bar surface, the top edge of one of said flanges on one of said mowers being positioned between said generally vertical surfaces, a second connecting device on said second end of said bar connected with the other of said flanges on the other of said mowers, a plurality of spaced openings through said flanges for receiving pins to adjustably connect said flanges with said connecting devices, wheel means positioned proximate said second end of said bar for supporting same, drawing means connectable to a towing device coupled to said bar, and one of said connecting devices being spaced rearwardly of said bar from the other of said connecting devices.

2. The hitch of claim 1 wherein said second end of said bar includes a rearwardly extending rigid support and said second connecting device includes a vertical portion overlapping a portion of said support in spaced relationship thereto to define a downwardly opening space for receiving the upper edge of the other of said flanges to tow the other of said mowers in trailing relationship to said one mower.

3. A hitch for lawn mowers and the like, said hitch being generally L-shaped in plan view and including a horizontal bar and a rigid frame extending rearwardly from one end of said bar, connections on the other end of said bar and the outer end of said rigid frame, each said connection including a substantially vertical connecting plate elongated generally parallel to said bar for positioning over and behind an upstanding plate on the front of a lawn mower or the like for towing such mower by force transmitted from said connecting plate to the upstanding plate on the mower when said hitch is pulled, and means on said bar intermediate said connections for attaching said hitch to a towing device.

4. The hitch of claim 3 wherein said connections include additional surfaces spaced from said connecting plates to define downwardly opening spaces for receiving the upper edge portions of upstanding plates on lawn mowers or the like.

5. The hitch of claim 3 wherein said bar has a plurality of spaced-apart holes therealong from said other end thereof for adjusting said connection on said other end of said bar toward and away from said connection on said rigid frame to vary the spacing between said connections.

6. The hitch of claim 3 wherein said bar comprises an angle iron and said rigid frame includes spaced-apart rearwardly extending angle irons welded to said bar.

7. The hitch of claim 3 wherein said connecting plates have a plurality of horizontally spaced-apart holes therethrough for receiving pins to attach such plates to upstanding plates on lawn mowers or the like.

* * * * *